Jan. 25, 1949.    M. FRANK    2,460,001
CABLE HOLDER AND GAUGE
Filed May 25, 1946    2 Sheets-Sheet 2
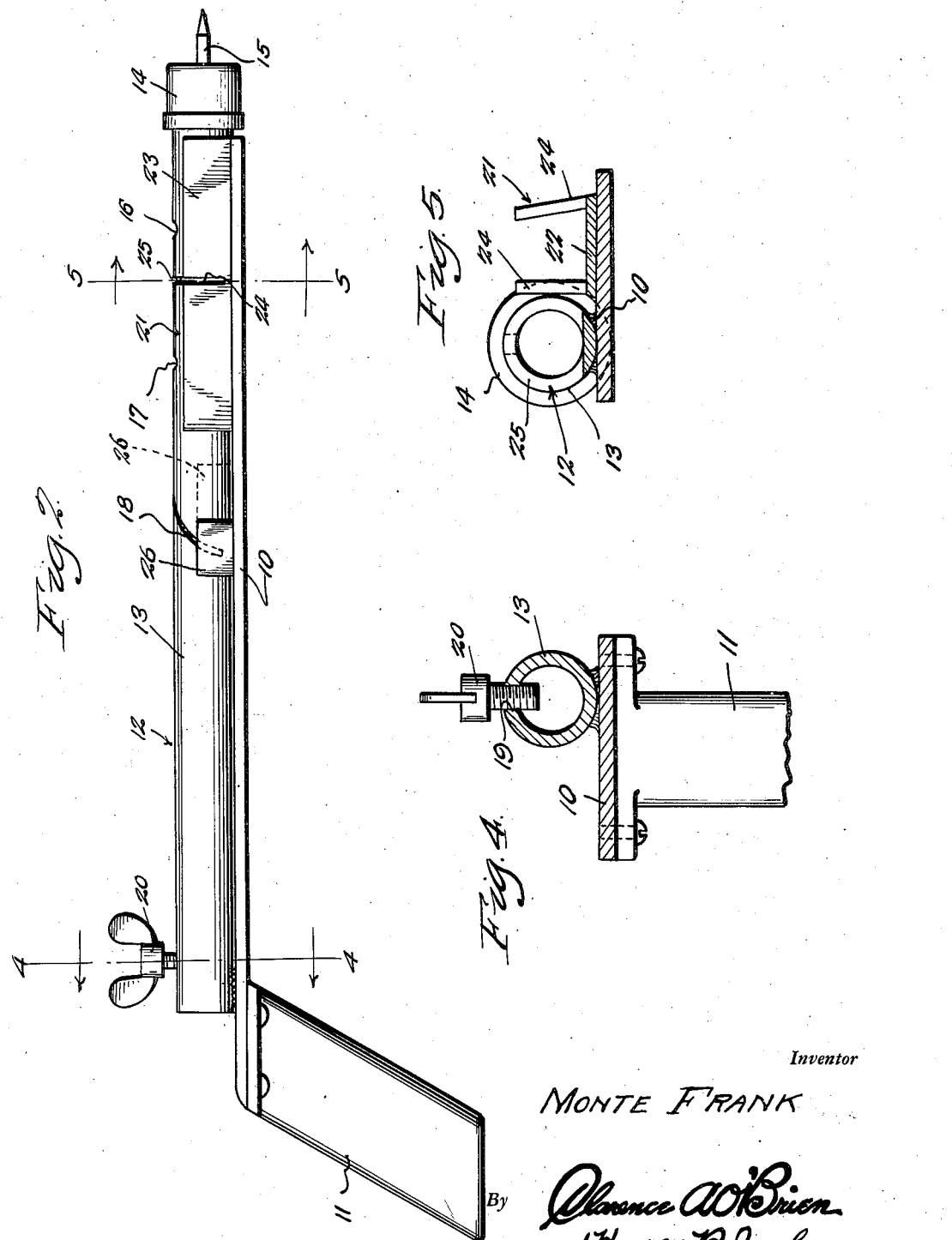
Inventor
MONTE FRANK
By Clarence A. O'Brien
and Harvey B. Jacobson
Attorney Patented Jan. 25, 1949

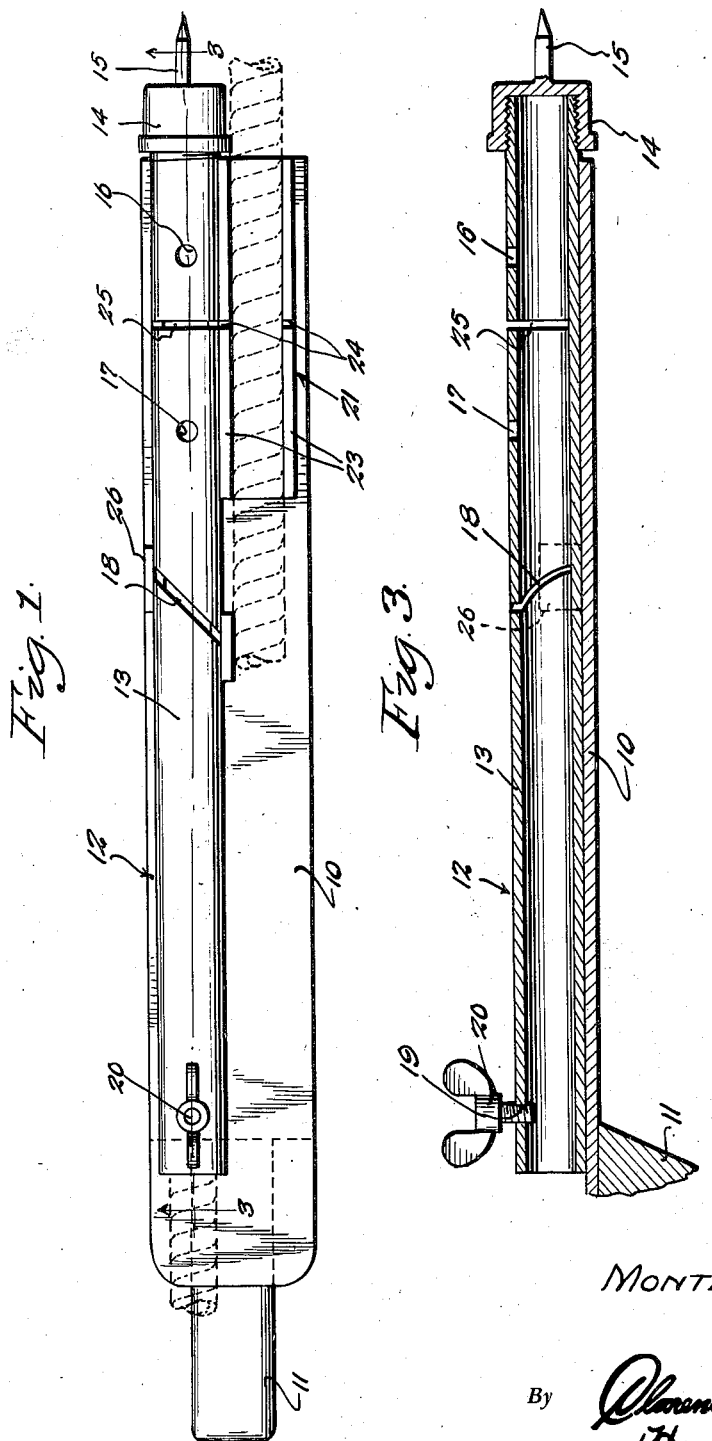

2,460,001

UNITED STATES PATENT OFFICE 2,460,001

CABLE HOLDER AND GAUGE

Monte Frank, Chicago, Ill.

Application May 25, 1946, Serial No. 672,315

1 Claim. (Cl. 29—67)

This invention relates to a cable holder and gage and has for its primary object to facilitate the cutting of armored electrical cable, and also to facilitate the cutting of the armor thereof at predetermined distances from the end of the cable.

Another object is to hold the cable steady while the cutting of the armor thereof progresses.

The above and other objects may be attained by employing this invention which embodies among its features a base, a tubular cable support on said base, said cable support having a diagonal slot therein through which a cutting tool is adapted to be introduced for cutting through the cable armor.

Other features include a spike projecting axially from one end of the cable support and adapted to be entered into a fixed support whereby the device may be steadied during the cutting of the cable armor, and a pistol grip at the end of the base opposite the spike.

Still further features include a clamp adjacent the cable support for holding a cable during the process of severing it into two parts.

In the drawings:

Figure 1 is a top plan view of a gage embodying the features of this invention,

Figure 2 is a side view of Figure 1,

Figure 3 is a fragmentary longitudinal sectional view taken substantially along the line 3—3 of Figure 1, Figure 4 is a transverse sectional view taken substantially along the line 4—4 of Figure 2, and Figure 5 is a transverse sectional view taken substantially along the line 5—5 of Figure 2.

Referring to the drawings in detail, my improved cable holder and gage comprises a base 10 to the underside of which is fixed adjacent one end a pistol grip 11, and supported on the upper side of the base 10 is my improved gage tube and cable support designated generally 12.

The gage tube and cable support 12 comprises a tubular body 13 which is welded or otherwise rigidly fixed to the upper side of the base 10 to one side of the longitudinal axis thereof. A cap 14 closes the end of the tubular body 13 at the end of the base 10 opposite the pistol grip 11, and carried by the cap is an axially disposed longitudinal spike 15 the use of which will more fully hereinafter appear. Formed in the upper side of the tubular body 13 are spaced sight openings 16 and 17 through which the cable is visible when it is introduced into the support 12. Formed in the body 13 in spaced relation to the openings 16 and 17 is a diagonal slot 18 through which a cutting tool is introduced to cut the armor of the cable as will be more fully hereinafter explained.

Formed in the upper side of the tubular member 13 adjacent the end near the pistol grip 11 is an internally screw threaded opening 19 for the reception of a thumb screw 20 by means of which the cable may be clamped in position in the device.

Mounted on the base 10 adjacent the cable support 12, and near the cap 14 is a cable clamp designated generally 21. This cable clamp 21 comprises a bed piece 22 which is welded or otherwise secured to the base 10 and carries at opposite sides upstanding slightly convergent flanges 23. These flanges are provided with transversely extending aligning slots 24 which are arranged in alignment with a transverse slot 25 formed in the cable support 12 between the sight openings 16 and 17.

In use, a cable which is to be cut in two is introduced into the cable clamp 21 between the side flanges 23, so as to intersect the slots 24. By introducing a cutting tool such as a hack saw, into the slots 24 and 25 it will be evident that the cable may be cut in two along a plane perpendicular to its longitudinal axis. Having thus cut the cable and desiring to cut through the armor as is required when making a junction, the cut end of the cable is introduced into the cable support 12 until its cut end is visible through one or the other of the sight openings 16 or 17, depending upon the length of armor that is to be removed. The thumb screw 20 is then turned in the threaded opening 19 firmly to clamp the cable in place and upon introducing a cutting tool such as a hack saw into the diagonal slot 18, the cutting of the armor may proceed. In order to avoid cutting the cable deeper than is necessary to sever the armor I secure hardened steel blocks 26 to the opposite sides of the cable support in a position to bridge the diagonal slot and limit the distance that the cutting tool may enter it. The sight openings 16 and 17 are located at a known distance from the diagonal slot 18, and the diagonal slot is located at a known distance from the inner end of the cap 14 so that the user by thrusting the cable the full length of the cable support 12 will produce a cut with the cutting tool in the diagonal slot a known distance from the end of the cable. In this way, a wide selection of cuts in the armor may be had. By thrusting the spike 15 into a fixed support such as a column, stud, or joist in a building which is being wired, and firmly grasping the pistol grip 11 it is obvious that the device may be held steady during the cutting operation.

While in the foregoing there has been shown and described the preferred embodiment of this invention it is to be understood that minor changes in the details of construction, combination and arrangement of the parts may be resorted to without departing from the spirit and scope of the invention as claimed.

What I claim is:

A cable holder and gage for use in cutting armored electrical cable comprising a base, a tubular cable support on said base and said cable support having a diagonal slot therein through which a cutting tool is adapted to be introduced for cutting through the cable armor, and said cable support having longitudinally spaced sight openings spaced known distances from the slot whereby the armor of an armored electrical cable may be severed a known distance from its end, a clamp near one end of the cable support temporarily to clamp a cable in the holder, a pistol grip fixed to the base beneath the clamp, a cap closing the end of the cable support remote from the pistol grip and a spike projecting from the cap in axial alignment with the cable support.

MONTE FRANK.

REFERENCES CITED

The following references are of record in the file of this patent:

UNITED STATES PATENTS

| Number | Name | Date |
|---|---|---|
| 144,406 | Mead | Nov. 11, 1873 |
| 937,954 | Pearson | Oct. 26, 1909 |
| 1,046,800 | Kawasaki | Dec. 10, 1912 |
| 1,111,388 | Johnson | Sept. 22, 1914 |
| 1,471,593 | Davis | Oct. 23, 1923 |
| 2,031,470 | Eck et al. | Feb. 18, 1936 |
| 2,376,858 | Barrans et al. | May 29, 1945 |